United States Patent [19]
Kubo

[11] Patent Number: 5,881,284
[45] Date of Patent: Mar. 9, 1999

[54] METHOD OF SCHEDULING A JOB IN A CLUSTERED COMPUTER SYSTEM AND DEVICE THEREFOR

[75] Inventor: Hidehito Kubo, Tokyo, Japan

[73] Assignee: NEC Corporation, Tokyo, Japan

[21] Appl. No.: 738,047

[22] Filed: Oct. 25, 1996

[30] Foreign Application Priority Data

Oct. 26, 1995 [JP] Japan ................................. 7-278647

[51] Int. Cl.<sup>6</sup> ..................................................... G06F 9/00
[52] U.S. Cl. ........................ 395/675; 395/671; 395/673
[58] Field of Search ................................. 395/671, 673, 395/675, 672; 707/103

[56] References Cited

U.S. PATENT DOCUMENTS

| | | | |
|---|---|---|---|
| 4,403,286 | 9/1983 | Fry et al. ............................... | 395/675 |
| 5,283,897 | 2/1994 | Georgiadis et al. .................... | 395/675 |
| 5,287,508 | 2/1994 | Hejna, Jr. et al. ..................... | 395/672 |
| 5,506,987 | 4/1996 | Abramson et al. ..................... | 395/673 |
| 5,630,124 | 5/1997 | Coyle, Jr. et al. ..................... | 707/103 |

FOREIGN PATENT DOCUMENTS

| | | |
|---|---|---|
| 57-757 | 1/1982 | Japan . |
| 61-231656 | 10/1986 | Japan . |
| 4-60745 | 2/1992 | Japan . |
| 4-352237 | 12/1992 | Japan . |
| 5-101019 | 4/1993 | Japan . |
| 7-129520 | 5/1995 | Japan . |
| 7-225746 | 8/1995 | Japan . |
| 7-234847 | 9/1995 | Japan . |

OTHER PUBLICATIONS

JES3 Job Management; MVS/ESA SP V5 JES3 Initialization and Tuning Guide; IBM Corporation 1988, 1995; pp. 89–137.

*Primary Examiner*—Majid A. Banankhah
*Attorney, Agent, or Firm*—McGinn & Gibb, P.C.

[57] ABSTRACT

A computer system and method of scheduling a job in a clustered computer system having a plurality of clusters and a global storage, stores an inputted job in a job queue allocated in the global storage, selects a job to be executed, and executes the selected job in a cluster. The job selection is activated by one of a job completion, a job arrival, and a measurement completion. Upon the job selection, if the resource utilization is low, then a new job is requested. However, if the resource utilization is high, then a new job is not requested.

21 Claims, 6 Drawing Sheets

METHOD OF SCHEDULING A JOB IN A CLUSTERED COMPUTER SYSTEM AND DEVICE THEREFOR

BACKGROUND OF THE INVENTION

The present invention relates to a method of scheduling a job and a device therefor so as to enhance a load balance between respective clusters in a clustered computer system.

Recently, parallel processors have been increasingly used for the structure of computer systems. Even the general-purpose computers generally have a clustered structure in which a plurality of processor groups that share a main memory are coupled to a shared memory (i.e., global memory). Each of the processor groups that share the main memory in that structure is called a "cluster".

In a clustered computer system, a load balance between the clusters is required to achieve a satisfactory system performance. For a tightly-coupled multi-processor system, an internal load share between the processors is automatically maintained at a nearly optimum level. This is because a queue of processes that wait for a processor is held in the shared main memory, and an idle processor immediately takes a process to be executed. Typically, the individual processes release the processor every several milliseconds (ms) for other jobs, and the queuing-up operation is repeated for again ensuring system productivity.

However, in a clustered computer system, particularly in a batch processing system, moving a job that starts to be executed in a cluster to another cluster creates a large overhead. Therefore, a unit of assigning a load to a cluster must be a job that requires several minutes or several tens of minutes of processing time, to make such an assignment feasible. Several jobs or several tens of jobs are running on each cluster simultaneously. This group of jobs is the work-load at the time. The work-load is required to be balanced between the respective clusters. However, the characteristics of the individual jobs that wait for execution (e.g., the length of a processing time, the load ratio of processors, etc.) are unknown in advance.

Keeping the utilization of all clusters to nearly 100% is relatively easy if the capacity of the main memory is sufficient, since a sufficiently large number of jobs may be executed by all clusters. However, some on-line processes are often processed in the same system, or some batch jobs having a processing priority are processed concurrently with the batch jobs. In these cases, a "nearly 100% policy" is detrimental to high priority tasks. Thus, the method of scheduling the batch job for the respective cluster suffers from a very serious and difficult problem in a clustered computer system.

SUMMARY OF THE INVENTION

In view of the foregoing problem of the conventional system, an object of the present invention is to provide a method of dynamic scheduling batch jobs and device therefor, which enable the loads between the respective clusters to be maintained always in a balanced state even over the short term, and the balanced state to be maintained near a target resource utilization over long term on the average. With those provisions, the maximum through-put satisfying a specified constraint can be enhanced. Moreover, each job processing time can be made more equal. Furthermore, a high priority job (e.g., an on-line process) can be executed quickly.

To solve the above problem, in a computer system having clusters according to a first aspect of the present invention, each of the clusters includes at least one processor. A measurement mechanism measures a utilization of the clusters. A job submitter requests a job to be executed in each of the clusters. A job controller controls a job being executed in each of the clusters, and detects the job completion. A request controller requests job selection upon the job completion from the job controller and upon the completion of a measurement by the measurement mechanism. A job selector selects a job to be executed in each of the clusters upon one of the job selection request from the request controller and the job request from the job submitter.

With the unique and unobvious structure of the present invention, the load balance is always dynamically maintained over a short term period as well as a long term period on the average. Further, a high-priority job is executed quickly.

BRIEF DESCRIPTION OF THE DRAWINGS

The above-mentioned and other objects, features and advantages of this invention will become more apparent by reference to the following detailed description of the invention taken in conjunction with the accompanying drawings in which.

DETAILED DESCRIPTION OF THE PREFERRED EMBODIMENTS

A method of scheduling a job in a clustered computer system in accordance with preferred embodiments of the present invention will be described in detail with reference to the accompanying drawings.

Figure 1:
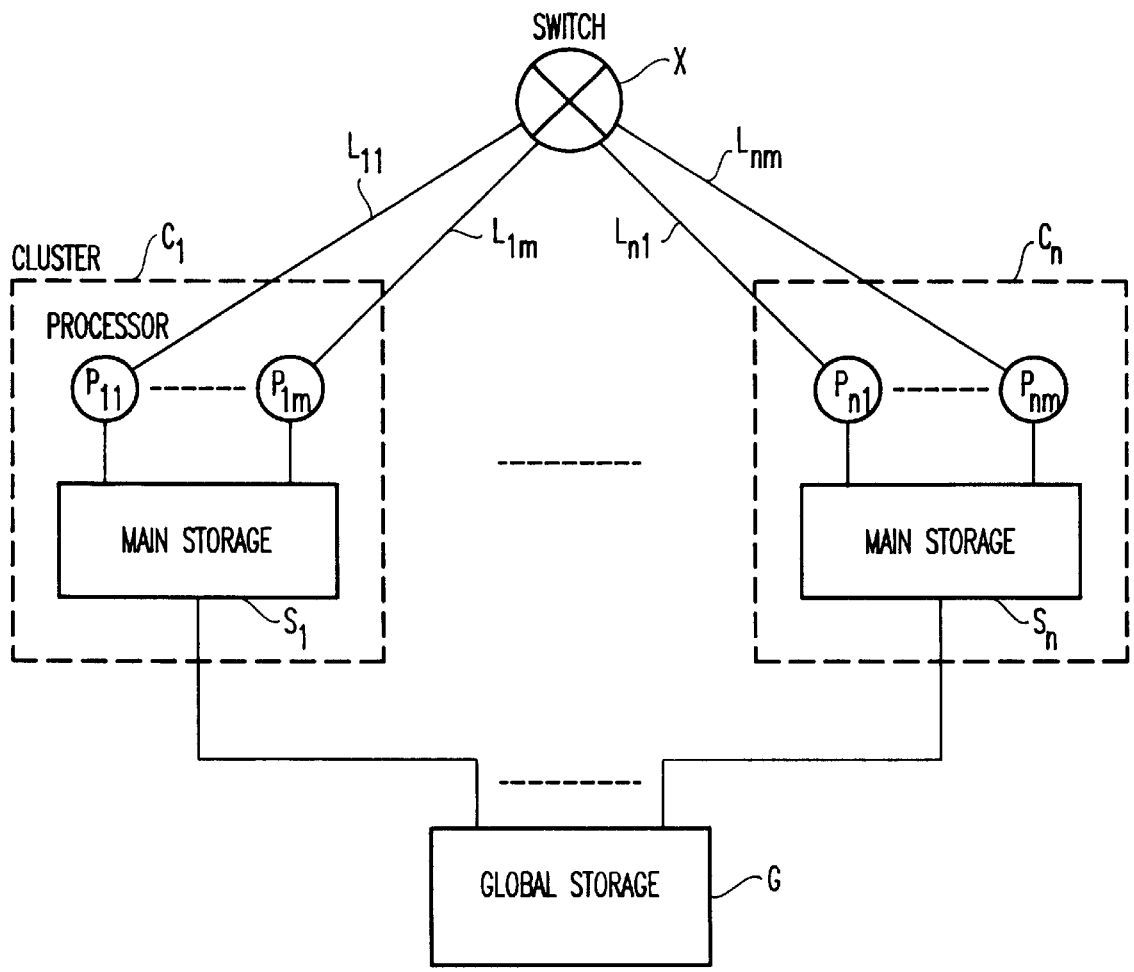
FIG. 1 is a block diagram showing the configuration of a clustered computer system according to an embodiment of the present invention.

Referring to FIG. 1, the structure of a clustered computer system to which the present invention is applied has a plurality of processors and a main storage. For example, "m" processors $P_{I1}$ to $P_{Im}$ share a main storage $S_I$, thereby forming a cluster $C_I$, where "m" is an integer. Thus, "n" clusters $C_I$ to $C_n$ coupled to a global memory G form one clustered computer system, where "n" is an integer.

The global memory G is, for example, made up of a semiconductor memory and a secondary memory such as a set of magnetic discs, and is used for the storage of the shared information of the entire system or the exchange of information between the clusters.

To enable the direct communication between arbitrary processors, signal lines $L_{ll}$ to $L_{nm}$ may be provided coupled to the respective processors, and to a switch X that exchanges signals on those lines. An operating system (OS) may exist in each of clusters to be controlled independently. A cluster may be logically divided into a plurality of sections each having another operating system.

Figure 2:
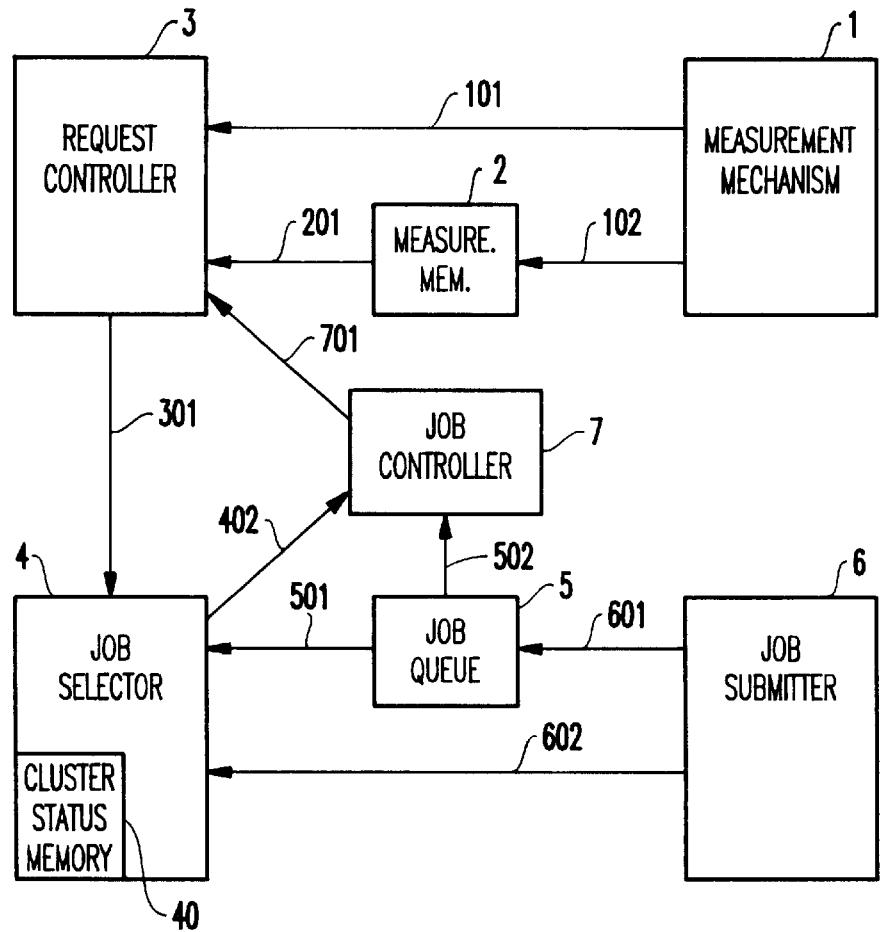
FIG. 2 is a block diagram showing a mechanism of scheduling a job in the clustered computer system according to the embodiment of the present invention.

Referring to FIG. 2, a mechanism of scheduling a job in a clustered computer system includes a measurement mechanism 1 for measuring a utilization of a cluster, a measurement memory 2 for storing a measurement result, a request controller 3 for requesting a job selection, a job selector 4 for selecting a job, a job queue 5 for storing one or more job requests, a job submitter 6 for submitting a job, and a job controller 7 for controlling a job, The job selector 4 has a cluster status memory 40 for storing identifiers of clusters which have room (space) for accepting and running new jobs.

When a job is input for batch processing, the inputted job is received by the job submitter 6 (contained in one, some or all of the clusters) through a line 601, and registered in the job queue 5 in the global storage G. The measurement mechanism 1 exists in each of the clusters, and is activated at every predetermined time (e.g., "1" second), so as to measure the resource utilization in the cluster after the previous measurement. The resource utilization is, for example, the use ratio of processors, the use ratio of channels, the ratio of an area used in the main storage, a paging frequency, an input/output operation frequency, the use ratio of a software resource (e.g., a control table) in the cluster and the like.

The request controller 3 is activated not only by job completion but also by measurement completion, as described below referring to FIGS. 3 and 4. Then, the request controller 3 activates the job selector 4 through a line 301. The job selector 4 is activated even when a new job is registered therein by the job submitter 6 through a line 602. Therefore, a job will be selected at three different timings (e.g., through line 301 activated by line 101, through line 301 activated by line 701, and through line 602).

Figure 3:
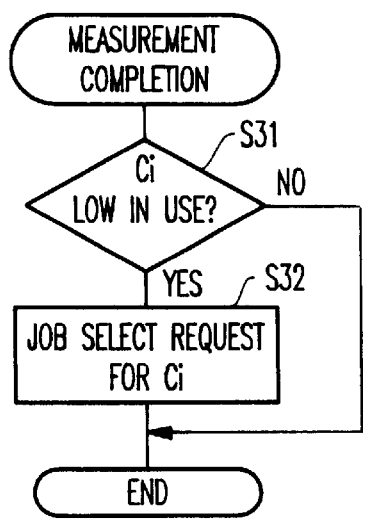
FIG. 3 is a flowchart showing operations when a measurement is completed.

Referring to FIGS. 2 and 3, the measurement mechanism 1 stores a measured result $C_i$ into the measurement memory 2 through a line 102, and notifies the request controller 3 through a line 101. The request controller 3 that received the notification judges whether the utilization of the cluster $C_i$ is low according to the measured result stored (S31) as compared to a predetermined utilization rate. If the utilization is low in the cluster $C_i$, the request controller 3 requests a job select request to the job selector 4 through a line 301 so as to start a new job in the cluster $C_i$ (S32). If the cluster $C_i$ utilization is not low, then the selection of a job is not required.

The job selector 4 that receives the request selects a job suitable for a specified cluster from the job queue 5 from a line 501, and notifies a job controller 7 in the specified cluster of the selected job through a line 402. When a suitable job does not exist therein, no notification is required.

Upon receiving the notification of the selected job, the job controller 7 extracts the job from the job queue 5, starts executing the job, and controls the execution through its completion. Upon completion, the job controller 7 notifies the request controller 3 of the execution completion through a line 701.

Figure 4:
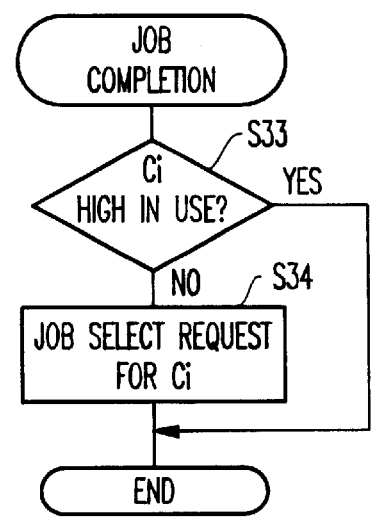
FIG. 4 is a flowchart showing operations when a job is completed.

Referring to FIGS. 2 and 4, the request controller 3, that has received the notification from the job controller 7, judges whether the resource utilization of the cluster that completes the job execution is high, according to the measured result stored in the measurement memory 2 (S33).

If the utilization is not high (e.g., as compared to a predetermined utilization rate set by the operator or designer), a request is transmitted from the request controller 3 to the job selector 4 through a line 301 so as to start scheduling a new job for the cluster.

If the utilization is high, the job selection is not required. Since the number of jobs which are executed simultaneously in the cluster is determined based on the resource utilization, the upper limit of the number of jobs simultaneously executed (a so-called "initiator number") must be set to a value slightly larger than the degree at which no limit is actually given thereto.

To determine whether the resource utilization is high, first and second threshold values are provided. Preferably, the first threshold value is set to a value near a target resource utilization rate and the second threshold value is set to a value larger than the first threshold value. If the measured value exceeds the second threshold value, then the resource utilization is judged to be high, and if not, then the utilization is judged not to be high.

On the other hand, to judge whether the resource utilization of a cluster is low, a third threshold value is provided as well as the first threshold value. Preferably, the third threshold value is set to a value of about 80% of the first threshold value. Of course, this value depends on the designer's specifications. A variable C is provided that counts the number of times when the resource utilization of the cluster is continuously lower than the first threshold value, and has an upper limit N.

Figure 5:
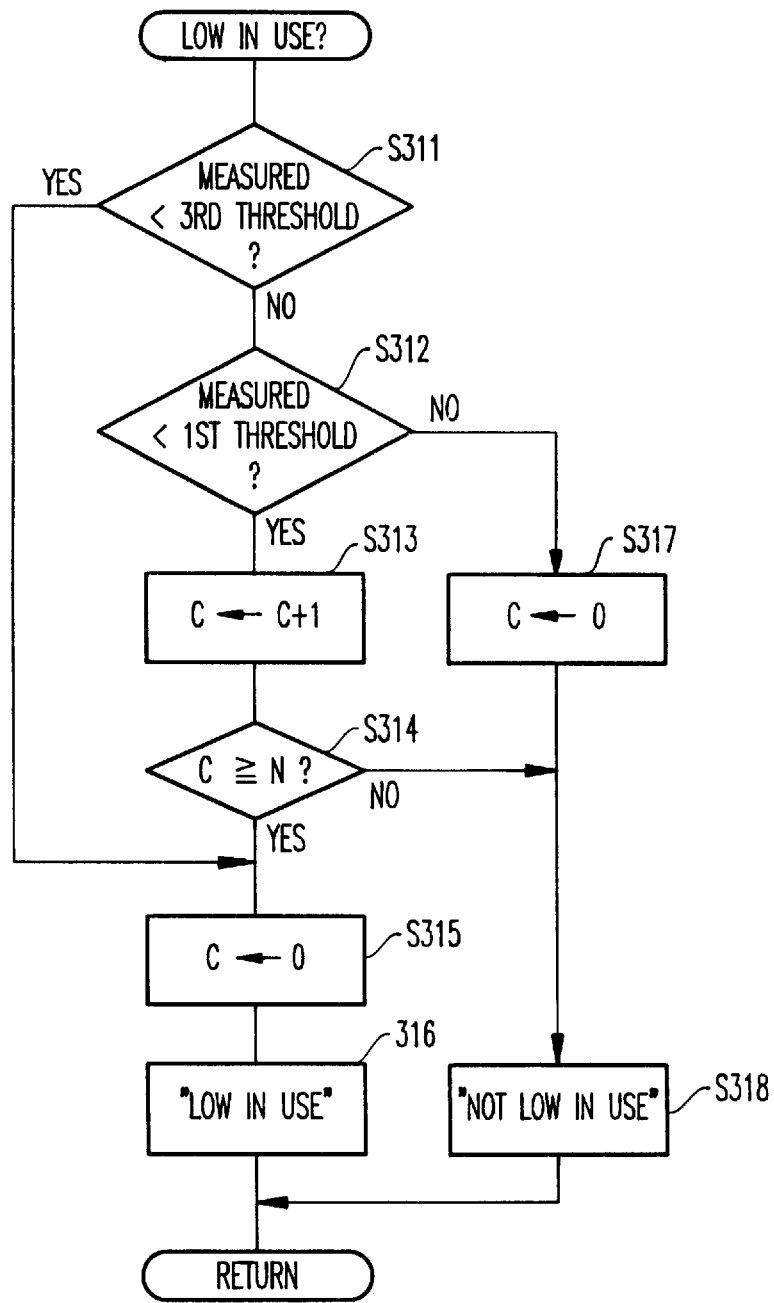
FIG. 5 is a flowchart showing operations for determining whether a utilization of a cluster is low.

Referring to FIG. 5, when the measured value is lower than the third threshold value ("YES" in S311), the process continues to step S315 in which C is set to "0" and thereafter it is unconditionally judged that the utilization of the cluster is low (S316). Even when the measured value is not lower than the third threshold value ("NO" in S311), if the measured value is continuously (e.g., consecutively) lower than the first threshold value by N-times (as determined by steps S312, S313, and S314), it is judged that the utilization of the cluster is low (S316). In other cases (e.g., a "NO" in step S312 and setting C to "0" in step S317), it is judged that the utilization is not low (S318).

When the cluster is judged to have low utilization, the variable C for the cluster is set to "0" (S315), thereby resetting to "0" the number of times when the resource utilization is continuously lower than the first threshold value. The reset is necessary when the resource utilization is lower than the third threshold value because there is a high probability that the resource utilization is successively lower than the first threshold value unless the reset is performed, and a high probability that a schedule request is issued again, and the number of execution jobs becomes excessive.

In another method of judging whether the resource utilization is low, the current resource utilization may be estimated according to the measured value historically obtained. For every measurement of the resource utilization by the measurement mechanism 1, the current utilization is estimated using the following expression (1). Assuming that "m" stands for the measured value, "e" stands for the estimated value, "T" stands for the present time, and "t" stands for a measurement interval, $$e(T)=a \times m(T)+(1-a) \times e(T-t) \qquad (1)$$

where "a" is a parameter satisfying "$0 < a \leq 1$". Further, the initial value of e(T) is set to $e(T_0)=m(T_0+t)$. That is, the sum of what is obtained by multiplying the present measured value "m(T)" by "a" and what is obtained by multiplying the previous estimated value "e(T−t)" by "(1−a)" is regarded as the present estimated value "e(T)". This expression can be developed as follows:

$$e(T)=a \times m(T)+a(1-a) \times m(T-t) +a(1-a)^2 \times m(T-2t)+a(1-a)^3 \times m(T-3t)+\ldots$$

This expression shows that the estimated value considers all the past measured values so that past measured values are as important as new values. As "a" is large (nearly "1"), the degree of making the most recent value important becomes higher. When judging whether the utilization is low or not by using the estimated value, the estimated value is merely compared with the first threshold value. When it is lower than the first threshold value, then it is judged that the utilization is low. When using the estimated value, preferably the third threshold value also is used together (e.g., with consideration of the first threshold) therewith.

Figure 6:
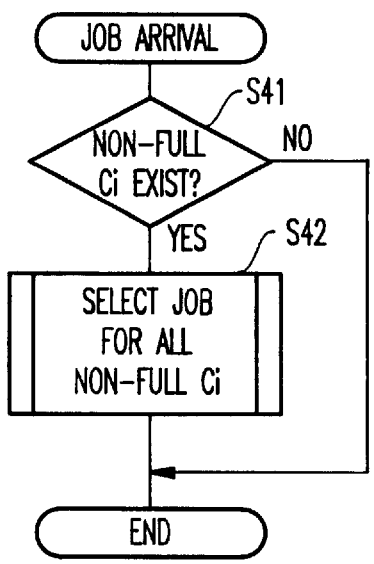
FIG. 6 is a flowchart showing operations when a job arrives.

Referring to FIG. 6, when the job submitter 6 notifies the job selector 4 of registration of a new job (e.g., a job arrival), the job selector 4 selects a job for the cluster $C_i$ if the cluster status memory 40 of the cluster $C_i$ indicates that $C_i$ is in a non-full state (S41).

Then, the job selector 4 selects an optimum job on the basis of, for example, the resource utilization of the cluster, the priority and class of the respective jobs under execution and waiting for execution, the constraints as to the entire system, the constraints given to a specified cluster and each of the job classes (S42).

Figure 7:
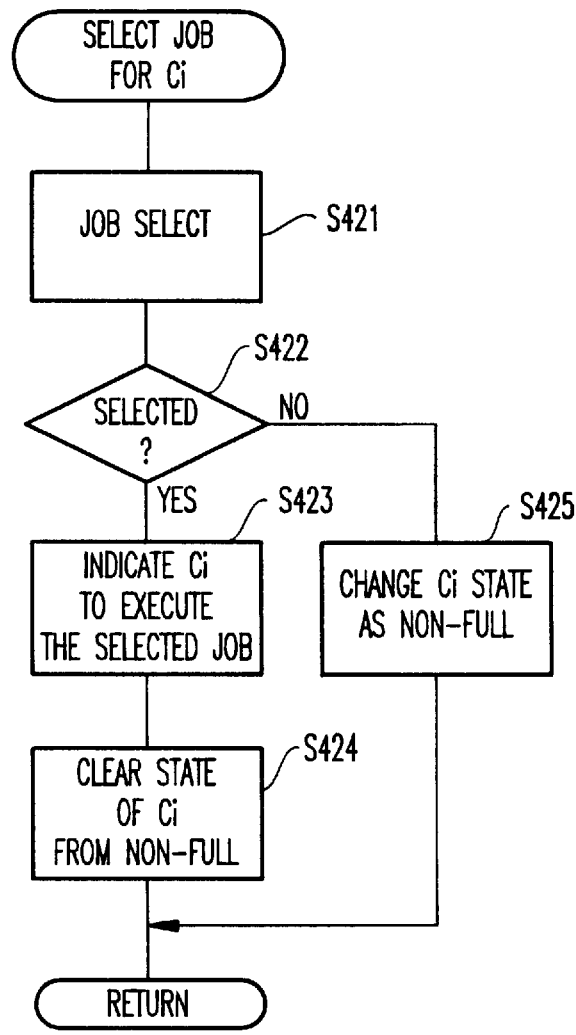
FIG. 7 is a flowchart showing operations of job selection for a cluster ($C_i$)

Referring to FIG. 7, the job selector 4 is activated by a job select request on the line 301. Then, the job selector 4 selects a job suitable for the specified cluster $C_i$ (S421). When no suitable job exists (S422), a state of the cluster $C_i$ is stored in the cluster status memory 40 as a non-full cluster (S425). If a suitable job exists, then the job selector 4 notifies the job controller 7 of the cluster $C_i$ of the selected job (S423). If the cluster $C_i$ has been registered in the cluster status memory 40 as a non-full cluster, then the registration is cleared (S424).

Next, a correspondence between a computer system shown in FIG. 1 and a scheduling mechanism shown in FIG. 2. is described. Since the measurement mechanism 1 measures the respective clusters, and the job controller 7 manages the execution on the respective clusters closely, the measurement mechanism 1 and the job controller 7 are necessarily provided in the clusters $C_I$ to $C_n$.

The job queue 5 should be included in the global storage G for the flexibility of the job selection. The job submitter 6 may exist in all clusters or only some clusters. The job selector 4 may be located in only one cluster $C_i$ for a centralized control, or may be located in respective clusters for a distributed control. Thus, there are two ways of positioning the job selector 4 depending on the type of control desired. The centralized control and distributed control have respective advantages/disadvantages, and should be selected depending on the system requirement or the system purpose.

Figure 8:
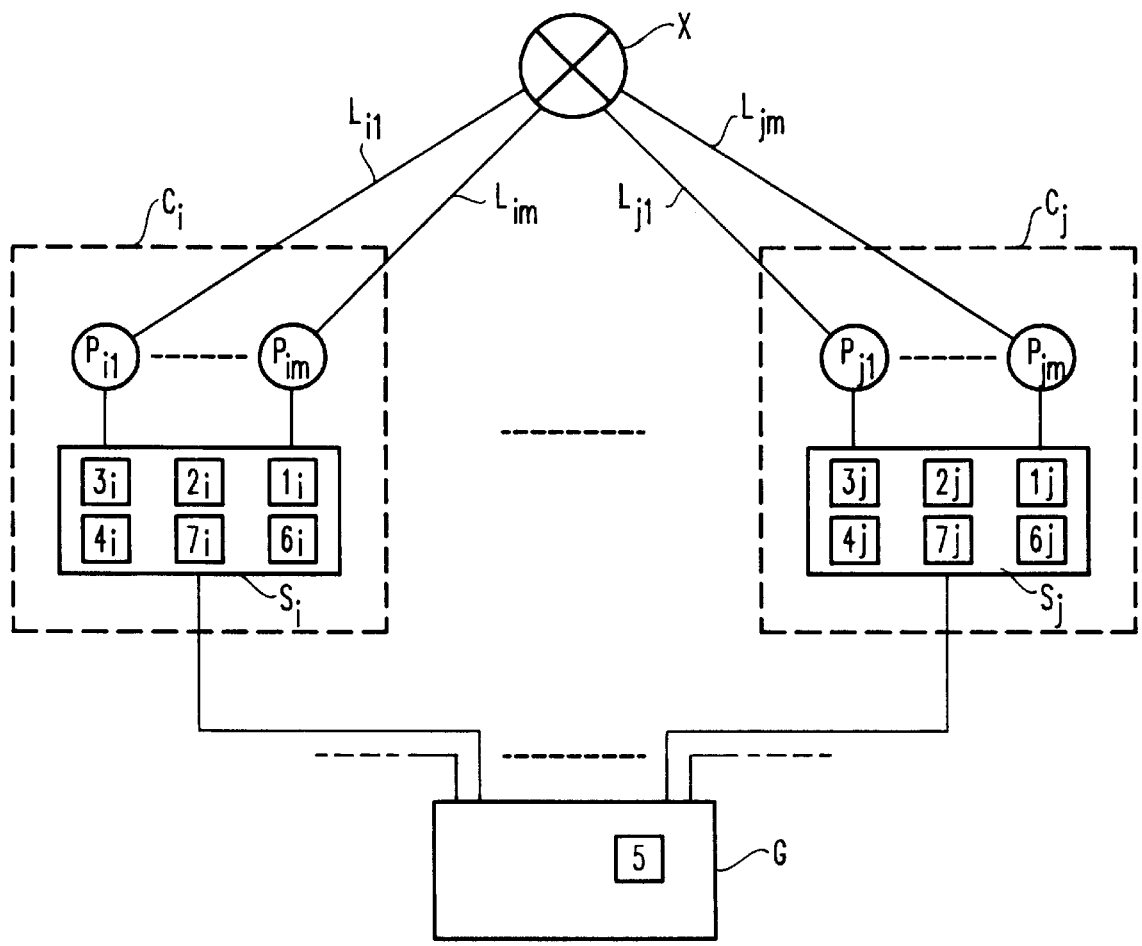
FIG. 8 is a block diagram showing a first arrangement of the scheduling mechanism and the clustered computer system.

Referring to FIG. 8, an embodiment in which the job selectors 4 are distributed in the respective clusters $C_I$ to $C_n$ will be described. In this example, the measurement mechanism 1, the measurement memory 2, the request controller 3, the job selector 4 and the job controller 7 each having the same function are distributed to all the clusters.

The inputted job is received by a job submitter 6i provided in a specific cluster or all the clusters, and then registered in a job queue 5 of the global storage G. The measurement mechanism $1_j$ measures the resource utilization in the cluster $C_j$ at every predetermined time period (e.g., every "1" second), stores the measurement result in the measurement memory $2_j$, and notifies the request controller 3 of the completion of the measurement.

The request controller $3_j$, that received the notification, judges whether the utilization of the cluster $C_j$ is low, on the basis of the measurement result stored in the measurement memory $2_j$. If the utilization is low, the job select request is transmitted to the job selector $4_j$ so that the cluster $C_j$ starts a new job.

The job select mechanism $4_j$ is started even when a new job is registered by an arbitrary job submitter $6_i$. The job submitter $6_i$ notifies all the clusters $C_I$ to $C_n$ through a signal line L to the switch X and through another signal line L passing through the switch X to the other clusters of the job. When no switch X and no signal line L exist (e.g., no switch and signal line are available), the job submitter $6_i$ writes the notification into the job queue 5, and thereafter the job selector $4_j$ searches the job queue 5 periodically. The job select mechanism $4_j$, that received the request, selects the job suitable for the cluster $C_j$ from the job queue 5, and notifies the job controller $7_j$ of the selected job.

The job controller $7_j$ extracts the notified job from the job queue 5, starts the job execution, and manages the job execution. Upon completion, the job controller $7_j$ notifies the request controller $3_j$ of the completion of the execution. The request controller $3_j$, that received the notification, judges whether the resource utilization of the cluster $C_j$ that completes the job execution is high, on the basis of the measurement result stored in the measurement memory $2_j$. If the resource utilization is not high, the request controller $3_j$ transmits a request to the job selector $4_j$ so that a new job is scheduled for the cluster $C_j$. The job select mechanism $4_j$ judges from the circumstances within cluster $C_j$, and selects the job from the job queue 5.

The above-mentioned structure prevents a specified cluster from receiving excessive loads for job selection and allows the clusters to receive jobs optimally matched to the specific cluster. Thus, the system maintains performance by avoiding such job selection bottlenecks. However, in the above structure, although the jobs waiting in the entire system can be monitored, it is difficult to obtain information as to the jobs executing in individual ones of other clusters. This problem is overcome with the structure of FIG. 9.

Figure 9:
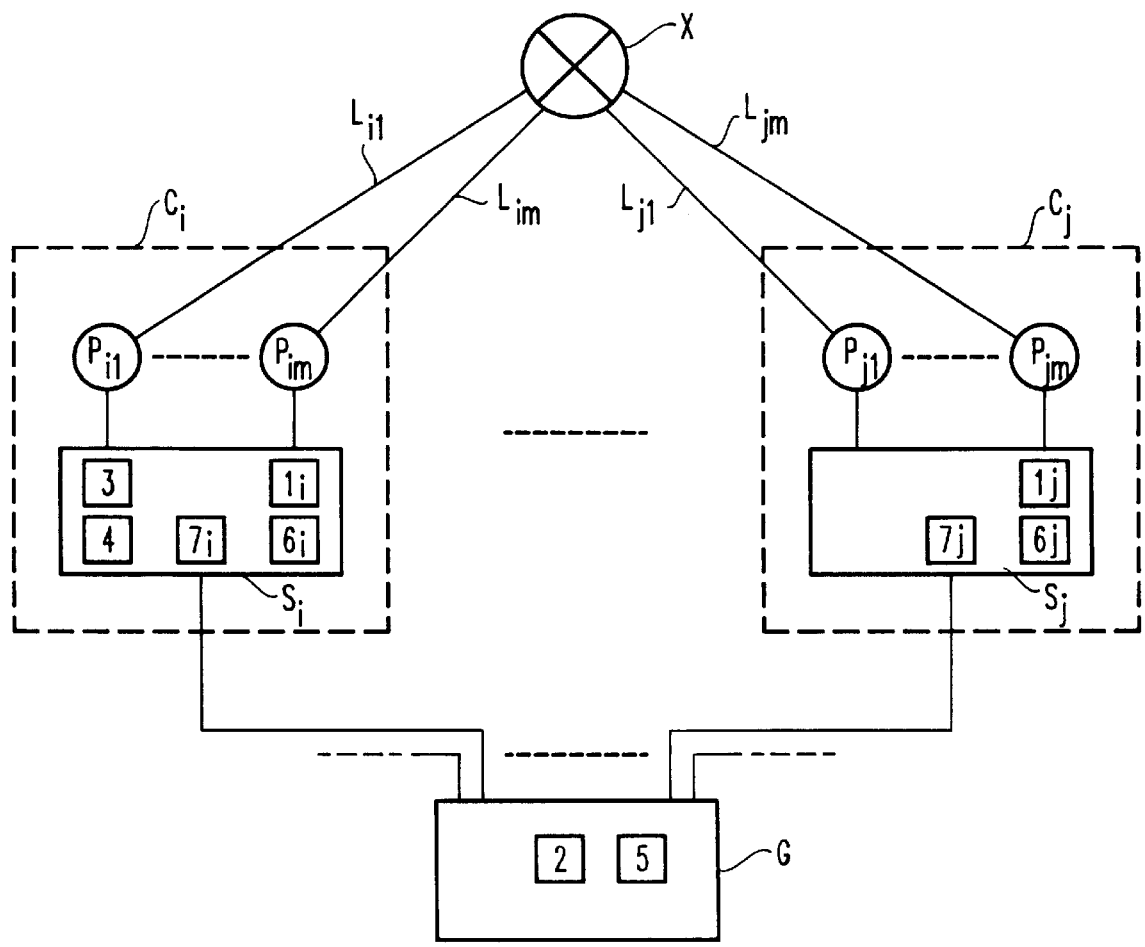
FIG. 9 is a block diagram showing a second arrangement of the scheduling mechanism and the clustered computer system.

Referring to FIG. 9, an embodiment in which the job selectors 4 are located only in the cluster $C_i$ will be described. In this example, the signal lines $L_{ll}$ to $L_{nm}$ between the processors and the switch X are essential. Described below are specified cluster $C_i$ having the job selector 4 and another cluster $C_j$ without the job selector 4.

The inputted job is received by the job submitter $6_k$ installed in all of the clusters or a specified cluster C, and registered centrally in the job queue 5 of the global storage G, where it waits for the start of the processing. on the other hand, the measurement mechanism $1_j$ exists in each cluster, and is started every predetermined time period (e.g. "1" second) to measure the resource utilization of the cluster. The measurement mechanism $1_j$ stores the measurement results in the measurement memory 2 allocated in the global storage G, and notifies the request controller 3, installed in the cluster $C_i$, of the measurement completion through the signal line 101.

The request controller 3 that received the notification judges whether the resource utilization of the cluster $C_j$ is low, on the basis of the measurement result stored in the measurement memory 2. If the utilization is low, the job select request is transmitted to the job selector 4 so that the cluster $C_j$ starts a new job.

The job selector 4 is started by a signal through a signal line L even when a new job is registered by a job submitter 6$_j$ of an arbitrary cluster C$_j$. The job selector 4 that received the request selects the job most suitable for the specified cluster C$_j$ from the job queue 5 (e.g., based on parameters listed above), and notifies the job controller 7$_j$ of the selected job through the signal line L.

The job controller 7$_j$ extracts the notified job from the job queue 5, starts the job execution, and manages the execution. Upon completion, the job controller 7$_j$ notifies the request controller 3 of the cluster C$_i$ of the completion of the execution through a signal on the signal line L. The request controller 3, that received the notification, judges whether the resource utilization of the cluster C$_j$ that completes the job execution is high, on the basis of the measurement result stored in the measurement memory 2. If the resource utilization is not high, the request controller 3 transmits a request to the job selector 4 of the cluster C$_i$ so that a new job is scheduled for the cluster C$_j$.

In the above-mentioned centralized job selection, the measurement memory 2 is allocated to the global storage G, and the request controller 3 and the job selector 4 are located in the same cluster C$_i$.

As a structural modification, although the job selector 4 may be located in the specified cluster C$_i$, the measurement memory 2 and the request controller 3 may be located in all the clusters C$_j$ which are subjected to measurement and the request of the job selections. In this method, the notification between the request controller 3$_j$ and the job selector 4 is conducted through the signal line L.

In the above-described centralized job selections, the combination of the jobs under execution for all the clusters C$_l$ to C$_n$ always can be acknowledged, and when a request of the job selection for a specified cluster C$_j$ is received from the request controller 3 or the job controller 7, an optimum job can be selected from the viewpoint of not only the load balance but also from the other jobs being processed, as well as the jobs waiting, throughout the entire system.

In the above-mentioned embodiments, the cluster C$_j$ is a job assignment unit. However, for a system in which one cluster is logically divided into a plurality of sections, and the respective divided sections are controlled by an independent operating system, a range of divided sections controlled by the independent operating system can be set as the job assignment unit. The global storage G can be used as a storage location of information as to the jobs executing (and/or waiting) in the respective clusters.

As mentioned above, the resource utilization measurement which forms a basis for judging a load state, may be determined by the processor use ratio, the channel use ratio, the main memory area use ratio, a paging frequency, and an input/output frequency, the use ratio of the software resource (e.g., control table) and the like. Preferably, the resource utilization which is the most important (and would likely form a bottleneck in the system) is measured, and on the basis of the measured utilization, the job should be scheduled. The resource utilization for the entire cluster may be measured at a single timing together as a whole, or may be conducted at different timings, individually.

In the above-mentioned embodiment, three threshold values are introduced. The threshold values may be desirably and selectively changed for the entire cluster, depending on the kind of resource forming the basis for judgement, an object of the load distribution and the system structure, although those values are usually the same for the respective clusters.

For the hardware structure, all the clusters have the same number of processors. However, the number of processors for each cluster may be different. The performance of the individual processors and the capacity of the main memory may not necessarily be identical to each other. When there is a difference, the threshold value is desirably changed in accordance with the above-mentioned factors.

As described above, according to the present invention, a dynamic batch job scheduling method is provided in which the load between the clusters is always maintained in a balanced state over a short term and a long term period, and the balanced state can be maintained substantially near or at a target resource utilization rate.

Experimental simulation results have shown that with the application of the inventive method and structure employing the processor use ratio as the resource utilization, the dispersion of the processor use ratio can be decreased 20 to 30% in comparison with the controlling method using only the number of simultaneous job executions. As a result, the system can afford to process an on-line load or a high priority load all the time, and the usual batch job processing time dispersion can be reduced (e.g., by 20 to 30%).

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated.

Thus, while the invention has been described in terms of several preferred embodiments, those skilled in the art will recognize that the invention can be practiced with modification within the spirit and scope of the appended claims.

What is claimed is:

1. A computer system having clusters, each of said clusters including at least one processor, said computer system comprising:

a measurement mechanism for measuring a utilization of each cluster of said clusters;

a job submitter for submitting a job to be executed in a cluster of said clusters;

a job controller for controlling the job executed in said cluster of said clusters, and detecting a completion of the job;

a request controller for requesting job selection upon the completion of the job from said job controller according to a measurement result from said measurement mechanism; and a job selector for selecting a job to be executed in a cluster of said clusters upon one of the job selection request from said request controller and the job submission from said job submitter.

2. The computer system according to claim 1, wherein said request controller further requests the job selection to said job selector upon completion of the measurement by said measurement mechanism.

3. The computer system according to claim 2, wherein said request controller judges whether the utilization of at least one cluster of said clusters has a predetermined status based on said measurement result, and requests said job selector to schedule a job for said at least one cluster of said clusters when the utilization of said at least one cluster is judged to have said predetermined status.

4. The computer system according to claim 3, wherein said request controller upon the completion of a job further judges whether the utilization of a job completed cluster at which the job has just completed has a second predetermined status according to said measurement result, and requests said job selector to schedule a job for said job completed cluster when the utilization of said job completed cluster is judged not to have said second predetermined status.

5. The computer system according to claim 2, wherein said request controller upon the completion of a job judges whether the utilization of a job completed cluster at which the job has just completed has a predetermined status according to said measurement result, and requests said job selector to schedule a job for said job completed cluster when the utilization of said job completed cluster is judged not to have said predetermined status.

6. The computer system according to claim 5, wherein said measurement mechanism measures the utilization of said cluster at every predetermined timing, and said request controller judges that the utilization of said cluster has a second predetermined status, and requests said job selector to schedule a job for said cluster when the measurement result is continuously less than a first threshold value by a predetermined number of times.

7. The computer system according to claim 5, wherein said measurement mechanism measures the utilization of said cluster at every predetermined timing, said request controller estimates a resource utilization according to a measurement result previously obtained, and said request controller judges that the utilization of said cluster has a second predetermined status, and requests said job selector to schedule a job for said cluster when the estimated utilization becomes less than a first threshold value.

8. The computer system according to claim 6, wherein said request controller judges that the utilization of at least a first cluster has said predetermined status when a current measurement result of said first cluster exceeds a second threshold value which is higher than the first threshold value.

9. The computer system according to claim 8, wherein said request controller judges that the utilization of at least a second cluster has said second predetermined status when the current measurement result of said second cluster becomes less than a third threshold value which is lower than the first threshold value.

10. The computer system according to claim 7, wherein said request controller judges that the utilization of at least a third cluster has said predetermined status when a current measurement result of said third cluster exceeds a second threshold value which is higher than the first threshold value.

11. The computer system according to claim 1, wherein said job selector is distributed individually for each of said clusters one-by-one.

12. The computer system according to claim 1, wherein only one of said clusters includes said job selector.

13. A method for scheduling a job in a computer system having clusters, each of said clusters including at least one processor, said method comprising steps of:
    measuring a utilization of each cluster of said clusters;
    submitting a job to be executed in a cluster of said clusters; detecting a completion of a job being executed;
    requesting a first job selection upon the completion of the job according to a result of said measuring step; and
    selecting a job to be executed in a cluster of said clusters upon one of the job selection request in said first job selection requesting step and the job submission in said job submitting step.

14. The method for scheduling a job in a computer system according to claim 13, further comprising a step of:
    requesting a second job selection upon the completion of a measurement based on a result of said measuring step.

15. The method for scheduling a job in a computer system according to claim 14, wherein:
    said requesting a first job selection step includes steps of:
    first judging whether the utilization of a job completed cluster of said clusters at which the job has just completed has a first predetermined status according to the result in said measuring step upon the job completion; and
    first requesting to schedule a job for said job completed cluster when the utilization of said job completed cluster is judged not to have said first predetermined status in said first judging step, and said requesting a second job selection step includes steps of:
    second judging whether the utilization of said at least one cluster has a second predetermined status according to the result in said measuring step upon the completion of a measurement;
    second requesting to schedule a job for said at least one cluster of said clusters when the utilization of said at least one cluster is judged to have said second predetermined status in said second judging step.

16. The method for scheduling a job in a computer system according to claim 14, wherein:
    said requesting a first job selection step includes steps of:
    judging whether the utilization of a job completed cluster has of said clusters at which the job has just completed a predetermined status according to the result in said measuring step upon the job completion; and
    requesting to schedule a job for said job completed cluster when the utilization of said at least one cluster is judged not to have said predetermined status in said judging step.

17. The method for scheduling a job in a computer system according to claim 16, wherein said measuring step includes a step of measuring the utilization of said at least one cluster at every predetermined timing, and
    wherein said requesting a second job selection step includes a step of judging that the utilization has a second predetermined status when the measurement result is continuously less than a first threshold value by a predetermined number of times.

18. The method for scheduling a job in a computer system according to claim 17, wherein said requesting a first job selection step includes a step of judging that the utilization has said first predetermined status when a current measurement result of said job completed cluster exceeds a second threshold value which is higher than the first threshold value.

19. The method for scheduling a job in a computer system according to claim 18, wherein said requesting a second job selection step includes a step of judging that the utilization has said second predetermined status when the current measurement result of said at least one cluster becomes less than a third threshold value which is lower than the first threshold value.

20. The method for scheduling a job in a computer system according to claim 16, wherein said requesting a second job selection step includes steps of estimating a resource utilization according to a measurement result previously obtained, and judging that the utilization has a second predetermined status when the estimated utilization becomes less than a first threshold value.

21. A computer system having clusters, each of said clusters including at least one processor, said computer system comprising:

a measurement mechanism for measuring a utilization of each cluster of said clusters;

a job submitter for submitting a job to be executed in each cluster of said clusters;

a job controller for controlling the job executed in each cluster of said clusters, and detecting a completion of the job;

a request controller for requesting job selection upon the completion of the job from said job controller according to a measurement result from said measurement mechanism; and a job selector for selecting a job to be executed in a cluster of said clusters upon one of the job selection request from said request controller and the job submission from said job submitter.

* * * * *